United States Patent Office 3,483,456
Patented Dec. 9, 1969

3,483,456
BRUSHLESS DIRECT-CURRENT MOTOR WITH HALL-GENERATOR CONTROL
Julius Brunner and Erich Rainer, Nuremberg, Germany, assignors to Siemens Aktiengesellschaft, a corporation of Germany
Filed Apr. 27, 1967, Ser. No. 634,212
Claims priority, application Germany, Apr. 28, 1966, S 103,466
Int. Cl. H02k 29/02
U.S. Cl. 318—138      6 Claims

ABSTRACT OF THE DISCLOSURE

A brushless direct-current motor equipped with a permanent-magnet rotor is commutated with the aid of two Hall generators 90° displaced from each other which are mounted in recesses of the laminated stator stack and face the rotor. The two stator windings have respective mid-taps connected with each other. The two ends of each winding are connected to the collectors of two transistors whose bases are connected to the Hall-voltage electrodes of one of the respective Hall generators and this Hall generator has one of its current terminals connected to one pole of the direct-current source. The same pole is connected to the emitters of the two transistors.

---

Our invention relates to a brushless direct-current motor which has a permanent-magnet rotor and is commutated or controlled with the aid of Hall generators. The rotor, preferably constituted by a cylindrical and diametrically polarized magnet coacts with two stator windings which are 90° spacially displaced from each other and surrounded by a ring-shaped laminated stator structure.

It is an object of our invention to devise a brushless direct-current motor, whose electronic circuitry is simplified and whose number of circuit components is reduced in comparison with the known motor-commutator systems of this type.

To this end, and in accordance with a feature of our invention, the ring-shaped laminated stack structure of the stator is provided with recesses facing the permanent-magnet rotor and displaced 90° spacially from each other, and the two Hall generators are mounted in these respective recesses so as to lie in planes substantially tangential to a cylinder coaxial with the rotor. Furthermore, a pair of transistors of the same (pnp or npn) type is correlated to each of the two Hall generators, and the bases of these transistors are connected with each other through the Hall-voltage electrodes of the Hall generator. The emitters of the same pair of transistors are both connected to one pole of the direct-voltage supply means employed for energizing the motor windings, and one of the two current terminals of each Hall generator is also connected to this same pole of the direct-voltage supply means. The collectors of each pair of transistors are connected to the respective ends of one of the two stator windings respectively, and the mid-taps of the two windings are connected with each other.

The invention will be further elucidated with reference to embodiments illustrated by way of example in the accompanying drawings, in which.

Figure 3:
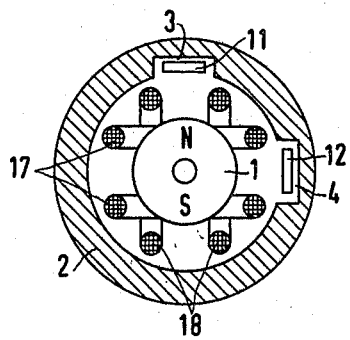
FIG. 3 shows schematically the basic construction of the motor.

Referring first to FIG. 3, the illustrated motor comprises a rotor 1 constituted substantially by a permanent magnet of cylindrical shape which is transversely magnetized, this being indicated by the magnetic pole designations N and S. The rotor is concentrically surrounded by a ring-shaped stator structure formed as a stack of laminations and denoted by 2. The stator further comprises two windings 17 and 18, each having two half-portions as will be more fully explained hereinafter. The ring-shaped stack 2 is shown provided with two recesses 3 and 4 which face the rotor 1 and accommodate respective Hall generators 11 and 12. Each Hall generator is of conventional design, having the shape of a rectangle with two current terminals along the respective two short sides and two Hall-voltage electrodes at the two long sides midway between the short sides, as will be seen from each of the Hall generates 11 and 12 in FIG. 1. The Hall generators may consist of wafers of indium antimonide or other suitable semiconductor materials, the necessary contacts and electrodes being formed by metal depositions. For further details of the motor construction, though not pertinent to the present invention proper, reference may be had to the publication by W. Dittrich and E. Rainer in Siemens Review, vol. 34, No. 3 (March 1967), pages 97 to 99.

Figure 1:
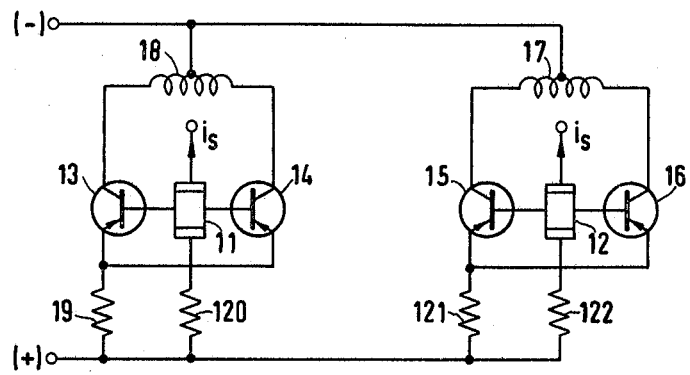
FIG. 1 is a schematic circuit diagram of a brushless direct-current motor with four transistors of the pnp type.

In the embodiment of the invention represented in FIG. 1, two transistors 13, 14 and 15, 16 are electrically connected with the respective stator windings 18 and 17. The transistors in this embodiment are all of pnp type. Each of the windings 17 and 18 has a mid-tap, thus forming two portions, as apparent from FIG. 3. The two windings 17 and 18 are angularly displaced 90° from each other. The circuit connections shown in FIG. 1 further comprise four resistors 19, 120, 121 and 122. The emitters of all four transistors are connected through the resistors 19 and 121 to the positive pole of the direct-voltage source, here represented by a positive bus and terminal. The one current terminal of each Hall generator that is positive relative to the potential of the Hall-voltage electrodes, is connected to the same positive pole of the direct-voltage supply in series with the resistor 120 or 122. The mid-points of the stator windings 17 and 18 are both connected to the negative pole of the direct-voltage source, this being represented by a common negative bus and negative terminal.

Figure 2:
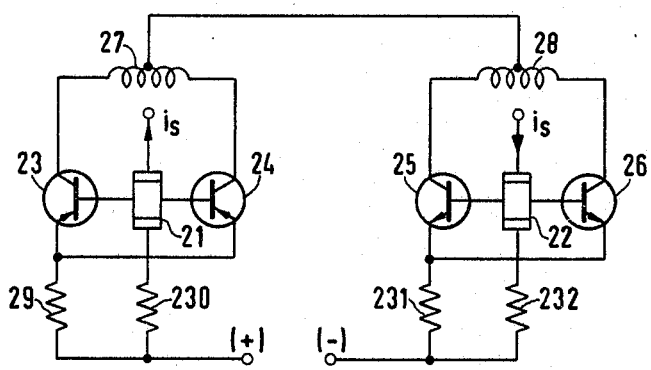
FIG. 2 is a schematic circuit diagram of a brushless motor according to the invention equipped with two transistors of the pnp type and two transistors of the npn type.

FIG. 2 illustrates a different way of embodying the invention. In this embodiment, one of the two Hall generators has associated therewith two transistors of the pnp type, whereas the other Hall generator is associated with two transistors of the npn type. The Hall generators in FIG 2 are denoted by 21 and 22, the four transistors by 23, 24, 25 and 26. The transistors 23 and 24 are of the pnp type, the transistors 25 and 26 of the npn type. Denoted by 27 and 28 are the two mid-tapped stator windings displaced 90° from each other. The emitters of the pnp transistors 23 and 24, as well as the one current terminal of Hall generator 21 that is positive with respect to the Hall-voltage electrodes, are connected through a resistor 29 or 230 to the positive pole of the direct-voltage supply. The emitters of the npn transistors 25 and 26 are connected with the minus pole of the direct-voltage supply means through a resistor 231; and the one current terminal of Hall generator 22 that is negative relative to the potential of the Hall-voltage electrodes is connected with the same negative pole through a resistor 232. The connection between the mid-points of the stator windings 27 and 28 is not connected to either pole of the supply of operating voltage.

A brushless motor according to the invention as embodied in the above-described examples is commutated in accordance with the following performance.

Since the two Hall generators are spaced 90° from each other, the magnetic field acting upon each Hall generator during rotation of the permanent-magnet rotor in synchronism with the rotation and with a cycle of 360°, involves a 90° phase displacement between the two Hall generators. During the periodic intensity changes of the magnetic field, the Hall generators are traversed by a constant control current $i_s$ (FIG. 1, 2). As explained, the Hall-voltage electrodes of each of the two Hall generators are connected to the bases of a pair of transistors. The emitters of the transistor pair appertaining to the same Hall generator having the same type, for example pnp or npn-type, are interconnected and attached to one pole of the direct-voltage supply either directly or, as illustrated, through a resistor. This one pole is the positive pole when using pnp transistors but the negative pole when using npn transistors. One of the control-current terminals of each Hall generator, namely the one which has a more positive potential than the Hall-voltage electrodes of a pnp transistor, or the pole that is more negative than the electrodes when using npn transistors, is connected directly or through a resistor to the same pole of the direct-voltage supply to which the emitter connections of the two appertaining transistors are also connected either directly or through a resistor.

With each of these connections, the control of the four transistors comes about by the potential difference between one of the two current terminals of each Hall generator and its Hall-voltage electrodes.

In all embodiments, the mid-points of the two stator windings are connected with each other. If all of the transistors are of the same type (pnp or npn), the interconnected mid-points are to be attached to the second pole of the direct-voltage source. If the type of the two transistors controlled by the same Hall generator differs from the type of the transistors controlled by the other Hall generator, the connection between the mid-points of the stator windings is not attached to either supply pole (FIG. 2).

Regardless of which alternative is chosen, the two transistors controlled by one of the Hall generators are alternately blocked, each time for 180° rotation of the rotor. Each Hall generator must be correctly correlated to the appertaining stator winding so that the transistors are blocked during just those intervals of time in which the electromotive force which the rotation of the rotor induces in the winding portions between collector and mid-tap has the same direction as the supply voltage (180° rotor rotation). For example, if the motor is a miniature motor operated from a battery, then the two transistors of each Hall generator are blocked during those intervals in which the rotor by its rotation generates in the appertaining half-portion of the stator winding a voltage of the same polarity as the battery voltage.

The speed of the above-described motors according to the invention can be regulated by controlling the constant control current $i_s$ of the Hall generators in dependence upon the rotating speed.

To those skilled in the art it will be obvious upon a study of this disclosure that our invention permits of various modifications with respect to structural features and circuitry and hence that the invention may be given embodiments other than particularly illustrated and described herein, without departing from the essential features of the invention and within the scope of the claims annexed hereto.

We claim:

1. A brushless direct-current motor comprising a permanently magnetic and diametrically polarized rotor, a stator having two mid-tapped windings spacially 90° displaced from each other and a ring-shaped stack of magnetizable laminations surrounding said windings and said rotor, said stack having two recesses facing said rotor and displaced 90° from each other, two Hall generators mounted in said respective recesses and each having two current terminals and two Hall-voltage electrodes, two pairs of transistors correlated to said respective Hall generators, the transistors of each pair being of the same type and having their respective bases connected to said two electrodes of the correlated one of said respective Hall generators, direct-voltage supply means for energizing said windings, said transistors of each pair having their emitters connected to one pole of said supply means, the one correlated Hall generator having one of its two current terminals connected to said one pole of said supply means, each of said pairs of transistors having its two collectors connected to the respective ends of one of said windings respectively and the mid-taps of said two windings being connected with each other.

2. In motor according to claim 1, all of said transistors being of the same type and their emitters being all connected to the same one pole of said direct-voltage supply means, said mid-taps of said two windings being connected to the other pole of said supply means.

3. In motor according to claim 1, all of said transistors being of the pnp-type and all of their emitters being connected to the positive pole of said direct-voltage supply means, said mid-taps of said two windings being connected to the negative pole of said supply means.

4. In the motor according to claim 1, all of said transistors being of the npn-type and all of their emitters being connected to the negative pole of said direct-voltage supply means, said mid-taps of said two windings being connected to the positive pole of said supply means.

5. In a motor according to claim 1, the said transistors of one of said pairs being of pnp-type and those of the other pair being of the npn-tppe, the emitters of said pnp-transistors being connected to the positive pole of said voltage supply means, the one Hall generator correlated to said pnp-transistors having its one current terminal whose potential is more positive than that of its Hall-voltage electrodes connected to said positive pole; the emitters of said npn-transistors being connected to the negative pole of said supply means, and said other Hall generator having its one current terminal whose potential is more negative than that of its Hall-voltage electrodes connected to said negative pole.

6. A brushless direct-current motor comprising a permanent-magnet rotor, a stator having two mid-tapped winings 90° displaced from each other and an annular stator structure surrounding said windings and rotor, two direct-voltage supply buses between which said windings are connected to be energized therefrom, and commutating means interposed between said buses and said windings and comprising two Hall generators mounted on said stator in the magnetic field of said rotor and 90° displaced from each other, each of said Hall generators having two current terminals and two Hall-voltage electrodes, two pairs of transistors correlated to said respective Hall generators, the transistors of each pair being of the same type and having their respective bases connected to said two electrodes of the correlated one of said respective Hall generators, said transistors of each pair having their emitters connected to one of said buses, said one bus being also connected to one of the current terminals of said one Hall generator, each of said pairs of transistors having its two collectors connected to the respective ends of one of said windings respectively, and the mid-taps of said two windings being connected with each other.

References Cited

UNITED STATES PATENTS

| | | | |
|---|---|---|---|
| 3,165,685 | 1/1965 | Manteuffel et al. | 318—254 |
| 3,200,316 | 8/1965 | Engel | 318—138 |
| 3,210,631 | 10/1965 | Niccolls | 318—254 XR |
| 3,250,971 | 5/1966 | Brunner et al. | 318—254 XR |
| 3,375,422 | 3/1968 | Bodigues | 318—254 XR |
| 3,383,574 | 5/1968 | Manteuffel | 318—254 |

ORIS L. RADER, Primary Examiner

G. R. SIMMONS, Assistant Examiner

U.S. Cl. X.R.

310—10; 318—254